(12) United States Patent
Munavalli Demanna

(10) Patent No.: US 11,341,268 B2
(45) Date of Patent: May 24, 2022

(54) SYSTEM AND METHOD FOR STORING DIGITAL DATA WITH ENHANCED PRIVACY

(71) Applicant: Rajesh Tergaon Munavalli Demanna, Bengaluru (IN)

(72) Inventor: Rajesh Tergaon Munavalli Demanna, Bengaluru (IN)

(73) Assignee: Rajesh Tergaon Munavalli Demanna, Bangalore (IN)

( * ) Notice: Subject to any disclaimer, the term of this patent is extended or adjusted under 35 U.S.C. 154(b) by 108 days.

(21) Appl. No.: 16/606,238

(22) PCT Filed: Apr. 10, 2018

(86) PCT No.: PCT/IB2018/052479
§ 371 (c)(1),
(2) Date: Oct. 18, 2019

(87) PCT Pub. No.: WO2018/193336
PCT Pub. Date: Oct. 25, 2018

(65) Prior Publication Data
US 2020/0125760 A1 Apr. 23, 2020

(30) Foreign Application Priority Data
Apr. 18, 2017 (IN) .............................. 201741013732

(51) Int. Cl.
*H04L 29/06* (2006.01)
*G06F 21/62* (2013.01)
*G06F 3/06* (2006.01)
*G06F 21/32* (2013.01)
*G06F 21/45* (2013.01)
*G06F 21/78* (2013.01)

(52) U.S. Cl.
CPC ........ *G06F 21/6245* (2013.01); *G06F 3/0622* (2013.01); *G06F 3/0637* (2013.01); *G06F 3/0673* (2013.01); *G06F 21/32* (2013.01); *G06F 21/45* (2013.01); *G06F 21/78* (2013.01); *G06F 2221/2143* (2013.01)

(58) Field of Classification Search
CPC .. G06F 21/6245; G06F 3/0637; G06F 3/0673; G06F 21/32; G06F 21/45; G06F 21/78; G06F 2221/2143
USPC .......................................................... 726/18
See application file for complete search history.

(56) References Cited

U.S. PATENT DOCUMENTS

| | | | | |
|---|---|---|---|---|
| 2007/0130436 A1* | 6/2007 | Shen | .................. | G06K 9/00087 711/163 |
| 2014/0129843 A1* | 5/2014 | Shi | .......................... | G06F 21/32 713/182 |

* cited by examiner

*Primary Examiner* — Evans Desrosiers

(57) ABSTRACT

The present invention provides a storage device (100) which consists of multiple access levels to access data or information depending on its importance, usefulness, severity, criticality and vulnerability. Further, the storage device (100) ensures data protection through confidentiality, integrity and accessibility for information security by disabling any connection with external communication channels such as Wi-Fi, Bluetooth and so on. Further, the storage device (100) is designed to erasing all the credentials data after 5 unsuccessful attempts ensuring security of the data or information. Authenticated data or information stored on the device can only be accessed by the owner of the device thereby preserving the integrity of the stored data. Reminders may be set for authentication related data which helps change the authentication credentials in time.

7 Claims, 3 Drawing Sheets

| Options | Input 1 | Input 2 | Input 3 | Complexity |
|---|---|---|---|---|
| Option 1 | AF1 | | | SIMPLE |
| Option 2 | AF2 | | | SIMPLE |
| Option 3 | AF1 | AF1 | | MEDIUM |
| Option 4 | AF1 | AF2 | | MEDIUM |
| Option 5 | AF2 | AF1 | | MEDIUM |
| Option 6 | AF2 | AF2 | | MEDIUM |
| Option 7 | AF1 | AF1 | AF1 | COMPLEX |
| Option 8 | AF1 | AF1 | AF2 | COMPLEX |
| Option 9 | AF1 | AF2 | AF1 | COMPLEX |
| Option 10 | AF1 | AF2 | AF2 | COMPLEX |
| Option 11 | AF2 | AF1 | AF1 | COMPLEX |
| Option 12 | AF2 | AF1 | AF2 | COMPLEX |
| Option 13 | AF2 | AF2 | AF1 | COMPLEX |
| Option 14 | AF2 | AF2 | AF2 | COMPLEX |

FIG 2 (a)

| Options | Input 1 | Input 2 | Input 3 | Complexity |
|---|---|---|---|---|
| Option 1 | RF1 | | | SIMPLE |
| Option 2 | RF2 | | | SIMPLE |
| Option 3 | RF1 | RF1 | | MEDIUM |
| Option 4 | RF1 | RF2 | | MEDIUM |
| Option 5 | RF2 | RF1 | | MEDIUM |
| Option 6 | RF2 | RF2 | | MEDIUM |
| Option 7 | RF1 | RF1 | RF1 | COMPLEX |
| Option 8 | RF1 | RF1 | RF2 | COMPLEX |
| Option 9 | RF1 | RF2 | RF1 | COMPLEX |
| Option 10 | RF1 | RF2 | RF2 | COMPLEX |
| Option 11 | RF2 | RF1 | RF1 | COMPLEX |
| Option 12 | RF2 | RF1 | RF2 | COMPLEX |
| Option 13 | RF2 | RF2 | RF1 | COMPLEX |
| Option 14 | RF2 | RF2 | RF2 | COMPLEX |

FIG 2(b)

SYSTEM AND METHOD FOR STORING DIGITAL DATA WITH ENHANCED PRIVACY

PRIORITY CLAIM

The present application is a U.S. national stage application (under 35 USC §§ 371) of PCT international application PCT/IB2018/052479 having an international filing date 10 Apr. 2018, which claims priority from Indian non-provisional application no 201741013732 filed with the Indian Patent Office on 18 Apr. 2017.

DESCRIPTION OF THE INVENTION

Technical Field of the Invention

The present invention relates to a system and method for storing digital data with enhanced privacy. More particularly, the invention relates to a stand-alone device that works independently without being connected to any communication channel. The device does not support Wi-Fi, Bluetooth or any other media of communication. Further, the invention is designed to work independently and will not connect or communicate with any other systems or devices for the purpose of information security enabled with multiple access levels to access data or information of varying complexity.

Background of the Invention

We often interact with data or information of varying complexities. Usually, systems employ a single password authentication method irrespective of data or information complexity thereby making the data vulnerable for misuse. Existing devices or systems are enabled with Bluetooth, Wi-Fi or other communication channels to facilitate communication with various other systems or devices. A major risk of accessing authenticated information or data in an unauthorized manner always prevails in such systems. Integrity of data is a fundamental requirement for any storage device or system to build and maintain a moral and commercial reputation.

The patent application WO0152023A9 titled "Method and system for secure personal authentication credentials data over a network" discloses a method and system for registering storing and managing personal data for use over a network, and for allowing users to register for, link to and log onto third party websites wherein the invention securely transmits authentication credentials data for automatic login at third party web sites. However, the major disadvantage is that the system communicates with third party websites leading to breach in (high risk and vulnerable) confidentiality, integrity and accessibility of data or information.

The patent application CN101577622A titled "Method for controlling access to shared component of leveled partition" discloses a method for controlling access to shared component of leveled partition. Further, the application discloses about unified and coordinated access control to maintain confidentiality, integrity and availability of a species-level partition. However, the invention does not reveal any information regarding the accessibility of data based on its complexity, importance, usefulness, severity, criticality and vulnerability.

The patent application U.S. Pat. No. 7,721,345B2 titled "Data security system and method" discloses a data security system and method, wherein the data is extracted and controlled on a granular basis, utilizing security protocols. Further, this document discloses an information processing system for securely storing data and rebuilding that data in the presence of an adequate security clearance, wherein the system determines the level of security clearance. The document also discusses about a method for securing data on a single personal computer. However, the major disadvantage is that the system allows multiple security control options like password, passphrase, multiple choice questions and answers, initial, intermediate and subsequent security clearance routines and biometric security routines like voice, fingerprint, signature, eye or retina scan which may permit unauthorized users to access the stored data in any of the disclosed methods.

The patent application U.S. Pat. No. 8,086,675B2 titled "generating a fingerprint of a bit sequence" discloses a method of generating a fingerprint of a bit sequence which includes determining a relative occurrence frequency of each bit combination of a set of bit combinations in the bit sequence, wherein the set of bit combinations comprises all possible non-redundant sub-sequences of bits having at least one bit and at most a preset maximal number of bits. However, the invention does not disclose the presence of any reminder that can be set and used for all the authentication data.

The patent application U.S. Pat. No. 8,550,339B1 titled "Utilization of digit sequences for biometric authentication" discloses systems and methods for implementing a sequence of fingerprints for biometric authentication as a sequence of fingerprints is more difficult to fraudulently circumvent than a single finger or thumb print. However, this invention may be connected to multiple systems or devices through various communication channels which may lead to reduced confidentiality, integrity and accessibility of the stored data or information.

Hence, there exists a need for a system or device that ensures confidentiality, integrity and accessibility of stored data or information that would be well received in the art.

SUMMARY OF THE INVENTION

The present invention overcomes the drawback in the prior art and provides system for storing digital data with enhanced privacy in an efficient and precise manner.

In a preferred embodiment of the invention, the system comprises a portable storage device which is based on confidentiality, integrity and accessibility for information security. The device stores data independently, without being connected to any communication channel. The storage device further comprises a display window to display a main menu and a credential menu. An access layer is provided in the storage device to enter different combinations and sequence of fingerprints. Further, the storage device also includes a non-USB power port to charge the battery of the storage device.

In a preferred embodiment of the invention, the storage device comprises a touchscreen keypad configured to enter the data manually, the memory in the storage device configured to store entered data. Further, the storage device further provides low battery alerts and reminder alerts.

Thus, the invention provides a storage device that ensures confidentiality, integrity and accessibility of stored data or information.

Further, the advantage of the present invention is that data/credentials or information stored on the device can only be accessed by the owner of the device. This feature of the invention ensures security of the stored data. The data will be erased off if any other person other than the owner of the data tries to access the device/data.

BRIEF DESCRIPTION OF DRAWINGS

The foregoing and other features of embodiments will become more apparent from the following detailed description of embodiments when read in conjunction with the accompanying drawings. In the drawings, like reference numerals refer to like elements.

FIG. 2 (a) and FIG. 2 (b) illustrate a table comprises access matrix and primary and recovery access options in accordance to one or more embodiment of the present invention.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention overcomes the drawbacks of the prior art by providing a storage device, designed to store data or information and protect it from unauthorized users. The invention comprises of a storage device which is fundamentally based on confidentiality, integrity and accessibility for information security. Information confidentiality refers to authenticated data or information which is not made available or disclosed to unauthorized individuals, entities or processes. Information Integrity refers to information or data that cannot be viewed or retrieved in an unauthorized or undetected manner using different devices or different communication channels.

Figure 1:
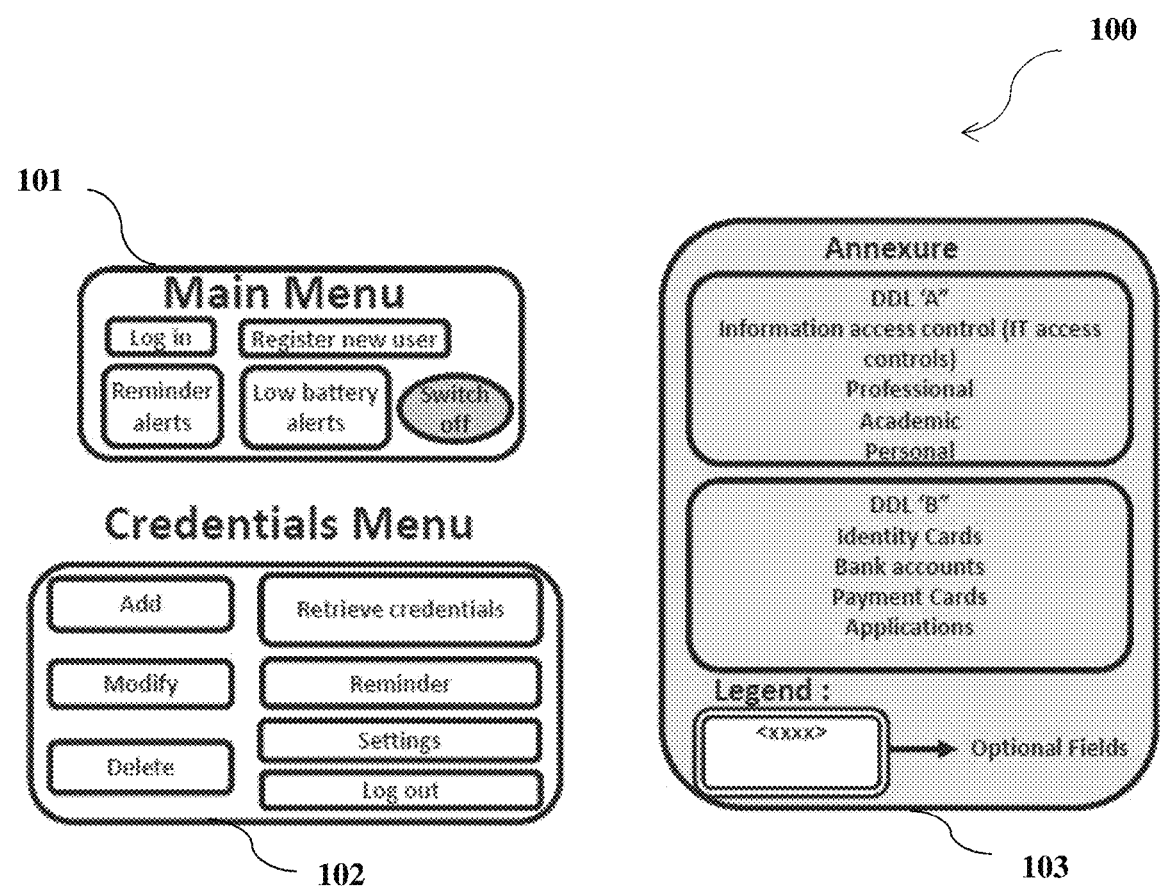
FIG. 1 illustrates a block diagram of a storage device in accordance to one or more embodiment of the present invention.

FIG. 1 illustrates a storage device (100) for information or data storage. The present invention comprises a main menu (101) and a credentials menu (102) which acts as a control unit of the storage device (100) itself.

The present invention is a stand-alone portable storage device that works independently without being connected to any communication channel. The device does not support Wi-Fi, Bluetooth or any other media of communication. Further, the invention is designed to work independently and will not connect or communicate with any other systems or devices for the purpose of information security.

In a preferred embodiment of the invention, the storage device comprises a display window to display a main menu and a credential menu. An access layer on the storage device provides the user to enter different combinations and sequence of fingerprint. The data is entered manually using touchscreen keypad and the entered data is stored in the memory of the storage device. Further, the storage device provides low battery and reminder alerts. A non-USB power port in the device helps to charge the battery of the storage device.

Data or information stored on the device can only be accessed by the owner of the device. This feature of the invention ensures security of the stored data. Further, the device is designed such that different combination of access levels can be set depending on the importance, usefulness, severity, criticality and vulnerability of the data.

The present invention is designed to be a secure store for all kinds of data or information. Different types of data or information including bank accounts, payment cards, vehicle registration numbers, driving license details, passport details, PAN details, PRAN (permanent account number) details, UAN (universal account number) details, ADHAAR Number, system log in details (computer, mobile phone), SSN (social security number) in USA, 'My Number' in Japan, property document details can be stored and referred to, using the invention. Hence, the data storage device can be used to store all kinds of data authentication and other personal data such as Passport number, PAN number and so on thereby covering a wide range of geographical locations.

The present invention is not connected to and does not communicate with any other device or system. The device cannot be accessed through Bluetooth, Wi-Fi and other channels of communication. Any data or information must be manually entered and stored on the device. This data can be retrieved only by the owner of the device. Further, the retrieved data will be displayed on the invention itself. A reminder can be set for all authentications related data which "helps" to change the authentication credentials in time.

According to the present invention, the owner of the data storage device (100) is required to register and log-in to the device for data or information retrieve and storage. If the owner is already registered on the device then, he/she will be directed to the main menu (102) of the storage device (100) after the log in process. Further, the owner can also access the credentials database to utilize the different functionalities of the storage device (100). Further, the owner can also access the credentials database to utilize the different functionalities of the storage device (100). But, if the owner is not registered on the storage device (100) then, a process of registration will have to be followed.

The present invention is designed in a manner in which the owner can remember the access to the storage device (100) easily since only the combinations and sequence of fingerprints should be remembered instead of alphanumeric values, numbers, characters, special characters and so on. Any attempt to trespass the fingerprint of the owner by unauthorized users employing different mechanisms is not possible.

Different combinations and sequence of fingerprint inputs are used to resolve this issue. It comprises of primary access and recovery access. The primary access involves two fingerprint input levels stored as Access Flag 1 (AF1) and Access Flag 2 (AF2). The recovery access involves two other fingerprint input levels stores as Recovery Flag 1 (RF1) and Recovery Flag 2 (RF2). The register and log in comprises a plurality of finger prints entered depending on the complexity of the data. For example, for simple data requires only one input hence, one finger to be entered. The medium level data requires two inputs to be entered and the complex data requires three inputs. The entered finger prints are stored in the memory of the device. Upon completion of biometric identity registration, the owner will be directed to the main menu of the storage device (100).

FIG. 2(a) and FIG. 2 (b) illustrate the table comprises access matrix and primary and recovery access options. In an embodiment of the invention, for registration access matrix displays different access options for primary and recovery access. Preferably, the combination of AF1, AF2 and RF1, RF2 has total of 14 options each for primary access and recovery access depending upon the complexity of the data to access the credential menu. If the primary access is failed, then there are three attempts to be given to recover access.

In an embodiment the primary access involves two fingerprint input options stored as Access Flag 1 (AF1) and Access Flag 2 (AF2). The recovery access involves two other fingerprint input levels stores as Recovery Flag 1 (RF1) and Recovery Flag 2 (RF2). The primary access and the recovery access has multiple log in information stored for simple, medium and complex data depending upon combinations of AF1, AF2 and RF1, RF 2 and complexity of the data.

In an embodiment, if the intended data or information is simple, it requires only two options. Similarly, if the information or data stored is critical, it requires four access options. But for highly complex data, eight access options are required. For example, if the data/credential is like PAN number, account holder name, bank name etc. then it is considered as simple data. If the data/credentials is like bank account number, phone number etc. then it is considered as medium data. Further, if the credentials are passwords, other confidential information etc. is considered as complex data.

In an embodiment, there are two options for primary and recovery access for simple data, namely AF1 as option 1, AF2 as option 2 and RF1 as option 1, RF2 as option 2. Similarly, for the primary and recovery access for medium level have four options, namely AF1 and AF1 as option 3, AF1 and AF2 as option 4, AF2 and AF1 option 5, AF and AF2 as option 6. The recovery access for medium access has also four options namely RF1 and RF1 as option 3, RF1 and RF2 as option 4, RF2 and RF1 as option 5, RF2 and RF2 as option 6.

Further, the primary access for the complex data has eight options namely, AF1 and AF1 and AF1 as option 7, AF1 and AF1 and AF2 as option 8, AF1 and AF2 and AF1 as option 9, AF1 and AF2 and AF2 as option 10, AF2 and AF1 and AF1 as option 11, AF2 and AF1 and AF2 as option 12, AF2 and AF2 and AF1 as option 13, AF2 and AF2 and AF2 as option 14. Likewise, the recovery access for complex data has eight options namely, RF1 and RF1 and RF1 as option 7, RF1 and RF1 and RF2 as option 8, RF1 and RF2 and RF1 as option 9, RF1 and RF2 and RF2 as option 10, RF2 and RF1 and RF1 as option 11, RF2 and RF1 and RF2 as option 12, RF2 and RF2 and RF1 as option 13, RF2 and RF2 and RF2 as option 14.

In an embodiment, In case the previous log-in attempt was unsuccessful, the storage device (100) triggers the recovery access that requires biometric authentication of the owner to facilitate successful log-in. If the owner exceeds more than five log-in attempts, the storage device (100) will automatically delete the entire credentials data or information. This feature of the present invention is included as an enhanced safety measure for the stored data or information. Further, if the storage device (100) is left inactive for 30 seconds or more, the storage device (100) logs-out automatically.

In accordance to one or more embodiment of the present invention, the storage device (100) consists of the main menu (101) which will be active soon after "switch-on" and consists of log in, switch off, register, reminder alerts and so on. However, no access to credentials data will be provided in the main menu (101). The storage device (100) also consists of the credentials menu (102) which is fundamental to the device itself. Further, the credentials menu (102) can be accessed only after successful log-in through various access levels and it consists of various options for the owner to manage and store the desired data or information. If a new credential has to be added to the storage device (100), the "add" option in the credentials menu (102) is selected. In order to access this option, the owner is required to provide his/her log-in detail along with the password. Upon successful log-in, the owner needs to select an appropriate credentials category provided in the annexure (103) according to the corresponding credential to be added. Further, the owner can manually input the name as well as the short name (also called the nick name) of the desired credential to be added. Once the new credential is successfully added, an option to set a reminder for the added credential is provided after which the owner is directed back to a screen containing two options, the credentials menu (102) and log-out. The owner can pick one of the two options depending on the requirement.

Pre-existing credentials can be modified by selecting the "modify" option in the credentials menu (102). Several options for editing the data or information are provided which can be used by the owner to modify the required credentials. Further, if the owner wants to edit or modify only the reminder settings, he/she can search for the corresponding credential by its short name or nick name and change the reminder settings as required. Once the desired modifications are made, the owner is directed back to a screen containing two options, the credentials menu (102) and log-out. The owner can pick one of the two options depending on the requirement.

Suppose the owner of the storage device (100) wishes to delete any credential, the "delete" option in the credentials menu (102) can be selected. The credential to be deleted can be searched by its short name or nick name. Further, before deleting the credential, an option to confirm deletion is displayed on the device screen. Upon confirmation, the respective credential will be deleted and the owner is directed back to a screen containing two options, the credentials menu (102) and log-out. The owner can pick one of the two options depending on the requirement. To ensure the security of the stored data or information, the entire data stored on the storage device (100) is deleted when more than five unsuccessful log-in attempts has been done. Data stored on the storage device (100) is only meant for reference and back-up.

The present invention provides an option to set a reminder for any data or information present in the database. An option to set a reminder can be selected from the credentials menu (102). Further, if the storage device (100) is running out of battery, an alert is triggered that displays the message "low battery-please connect to source" on the screen. This message automatically disappears once the storage device (100) is connected to a power source. Further, if the owner wishes to log-out, a confirmation option is displayed. Upon confirmation, the owner will be logged out and directed to the main menu (101).

The settings of the storage device (100) such as date and time, background color, system brightness, background light, duration of reminder, default log-out duration and low battery alert can be modified according to the owner's requirements by selecting the "settings" option in the main menu (101).

Figure 3:
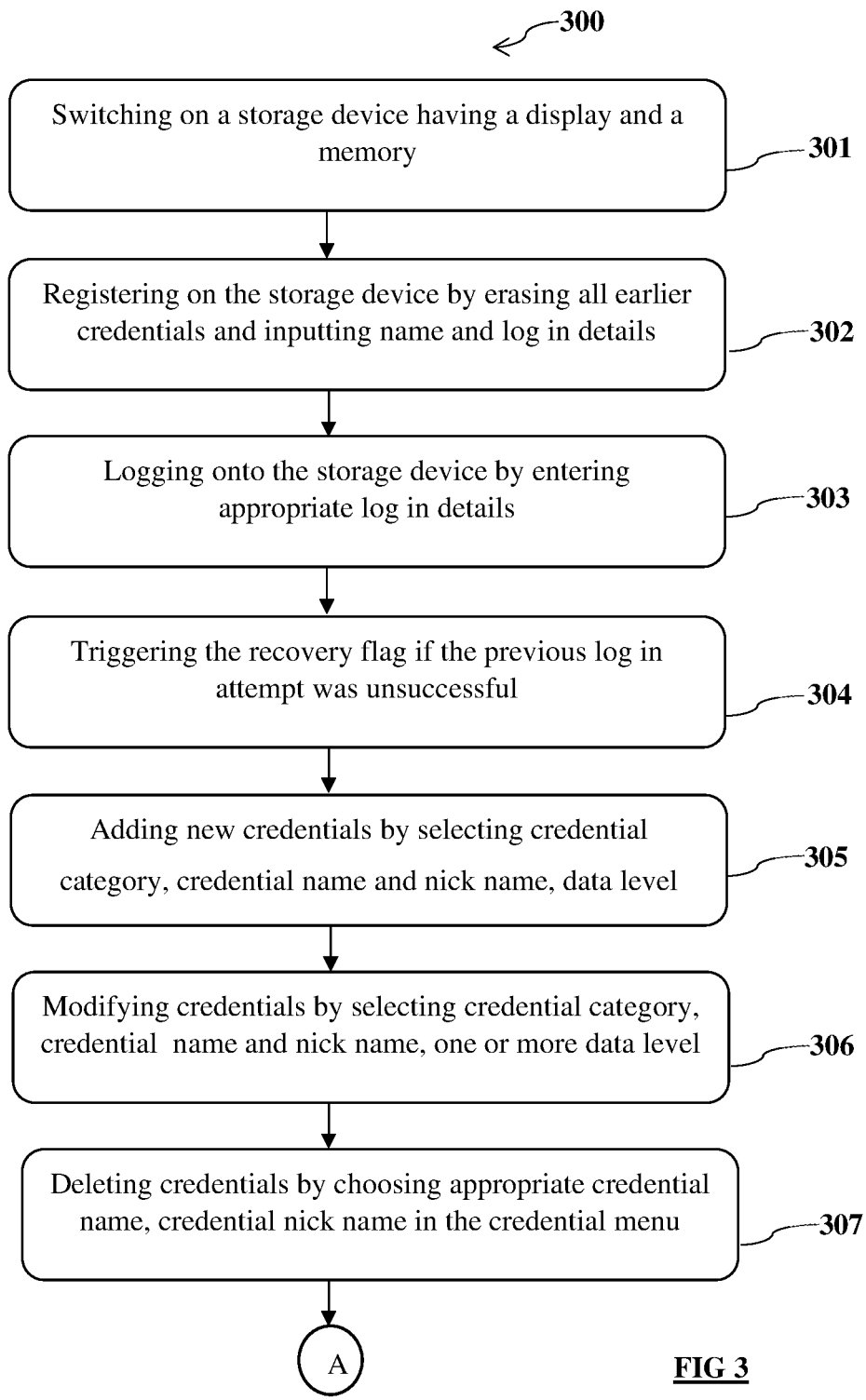
FIG. 3 illustrates a method for storing digital data with enhanced privacy

FIG. 3 illustrates a method for storing digital data with enhanced privacy. The method for storing digital data with enhanced privacy comprises the steps of switching on the storage device having a display and a memory at step 301. Once the storage device switched on it displays main menu that contains a plurality of options. At step 302, the process of registration is done on the storage device; the registration is followed by erasing all earlier credentials and inputting name and fingerprint. The fingerprint for both primary and recovery access is entered. Two fingerprints AF1 and AF2 are stored as primary access, whereas the other two finger prints RF1 and RF2 are stored as recovery access. The primary access and the recovery access has one or more log in information for as simple, medium and complex credential/data depending upon combinations of AF1, AF2 and RF1, RF 2. Further, primary and recovery access for simple data has two options, wherein the primary and recovery access for medium data has four options and the primary and recovery access for the complex data has eight options.

At step 303, appropriate sequence and combination of fingerprints are entered in order to log in to the storage device. Upon successful login user is directed to credential menu. When more than five unsuccessful log-in attempts have done, the credential information/data is deleted automatically. Further, storage device logs out automatically, in case the storage device is inactive for more than 30 seconds. At step 304, the recovery flag is triggered in case of previous log in attempt was unsuccessful. Upon triggering of recovery flag the sequence and combination of finger prints entered to get the recovery access. Suppose the recovery access successful then user is directed to the credential menu. Otherwise, the entire credential data is deleted in case more than 5 unsuccessful recovery access attempts.

At step 305, the new credentials added by selecting credential category, credential name and nick name, data level. The data can be entered in four levels after choosing appropriate credential name, nickname and category. At step 306 the credentials may modified by selecting credential category, credential name and nick name and one or more data level. Further, the credentials may deleted by choosing appropriate credential name, credential nick name in the credential menu at step 307.

At step 308, the credentials data retrieved on a need basis by choosing appropriate option. Reminder date can be set for the change of credentials at step 309. The credential/data is stored in different fields along with reminder date. At step 310, the credential category, reminder, credential name, nick name may modified by choosing appropriate options.

Hence, the present invention discloses a storage device (100) that ensures confidentiality, integrity and accessibility of stored data or information. Data/credentials or information stored on the device can only be accessed by the owner of the device. This feature of the invention ensures security of the stored data. The data will be erased off if any other person other than the owner of the data tries to access the device/data.

The description of the present system has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A system for storing digital data/credentials with enhanced privacy, the system comprising:
   a. a portable storage device which is based on confidentiality, integrity and accessibility for information security, to store data independently, without being connected to any communication channel, wherein the storage device comprises:
      i. a display window to display a main menu and a credential menu;
      ii. an access layer to enter different combinations and sequence of fingerprint, wherein different combinations and sequence of fingerprints are stored as log in information for registration and log-in to the storage device, wherein registration and log-in to the storage device includes a primary access and a recovery access, wherein the primary access involves two fingerprint input levels stored as Access Flag 1 (AF1) and Access Flag 2 (AF2) and the recovery access involves two other fingerprint input levels stored as Recovery Flag (RF1) and Recovery Flag (RF2);
      iii. a touchscreen keypad configured to enter the data/credentials manually;
      iv. a memory to store the entered data/credentials,
      v. a non-USB power port to charge the battery of the storage device, wherein the storage device provides low battery alerts and reminder alerts.

2. The system claimed in claim 1, wherein the storage device logs out automatically, when the storage device is inactive for more than 30 seconds.

3. The system as claimed in claim 1, wherein the primary access and the recovery access has one or more log in information for as simple, medium and complex credential/data depending upon combinations of AF1, AF2 and RF1, RF 2, wherein the primary and recovery access for simple data level access has two options, wherein the primary and recovery access for medium data level has four options, wherein the primary and recovery access for the complex data level has eight options.

4. The system as claimed in claim 3, wherein credential information is deleted automatically, when more than five unsuccessful log-in attempts.

5. The system as claimed in claim 1, wherein all options in the display of the storage device such as date and time, background color, system brightness, background light, reminder, duration of reminder, default log-out, low battery alert, credential information, credential category can be added, edited, deleted and modified by selecting appropriate option.

6. A method for storing digital data with enhanced privacy, the method comprising the steps of:
   a. switching on a storage device having a display and a memory;
   b. registering on the storage device by erasing all earlier credentials and inputting name, nickname and log in details, wherein the log in details include sequence and combination of fingerprint input from the user, wherein the primary access and the recovery access has one or more log in information for as simple, medium and complex log in information depending upon combinations of AF1, AF2 and RF1, RF 2, wherein the primary and recovery access for simple data has two options each, wherein the primary and recovery access for medium data has four options each, wherein the primary and recovery access for the complex data has eight options each;
   c. logging onto the storage device by entering appropriate log in details, wherein the credential/data is deleted automatically, when more than five unsuccessful log-in attempts;
   d. triggering the recovery flag if the previous log in attempt was unsuccessful;
   e. adding new credentials by selecting credential category, credential name and nick name, one or more data level;

f. modifying credentials by selecting credential category, credential name and nick name, one or more data level;

g. deleting credentials by choosing appropriate credential name, credential nick name in the credential menu;

h. Retrieving the credentials data on a need basis by choosing appropriate option, wherein choosing the appropriate option is done after successful log-in;

i. setting reminder date for the change of credentials in the credential menu, wherein the setting remainder date can set during adding new credentials; and j. modifying credential category, reminder, credential name, nick name by choosing appropriate options.

7. The method as claimed in claim 6, wherein the primary access and the recovery access for the simple credential/data has option 1 and option 2, wherein the primary access and the recovery access for the medium credential/data has option 3, option 4, option 5 and option 6, wherein the primary access and the recovery access for the complex credential/data has option 7, option 8, option 9, option 10, option 11, option 12, option 13 and option 14.

* * * * *